W. M. LEE.
Bee Hive.
No. 39,660. Patented Aug. 25, 1863.
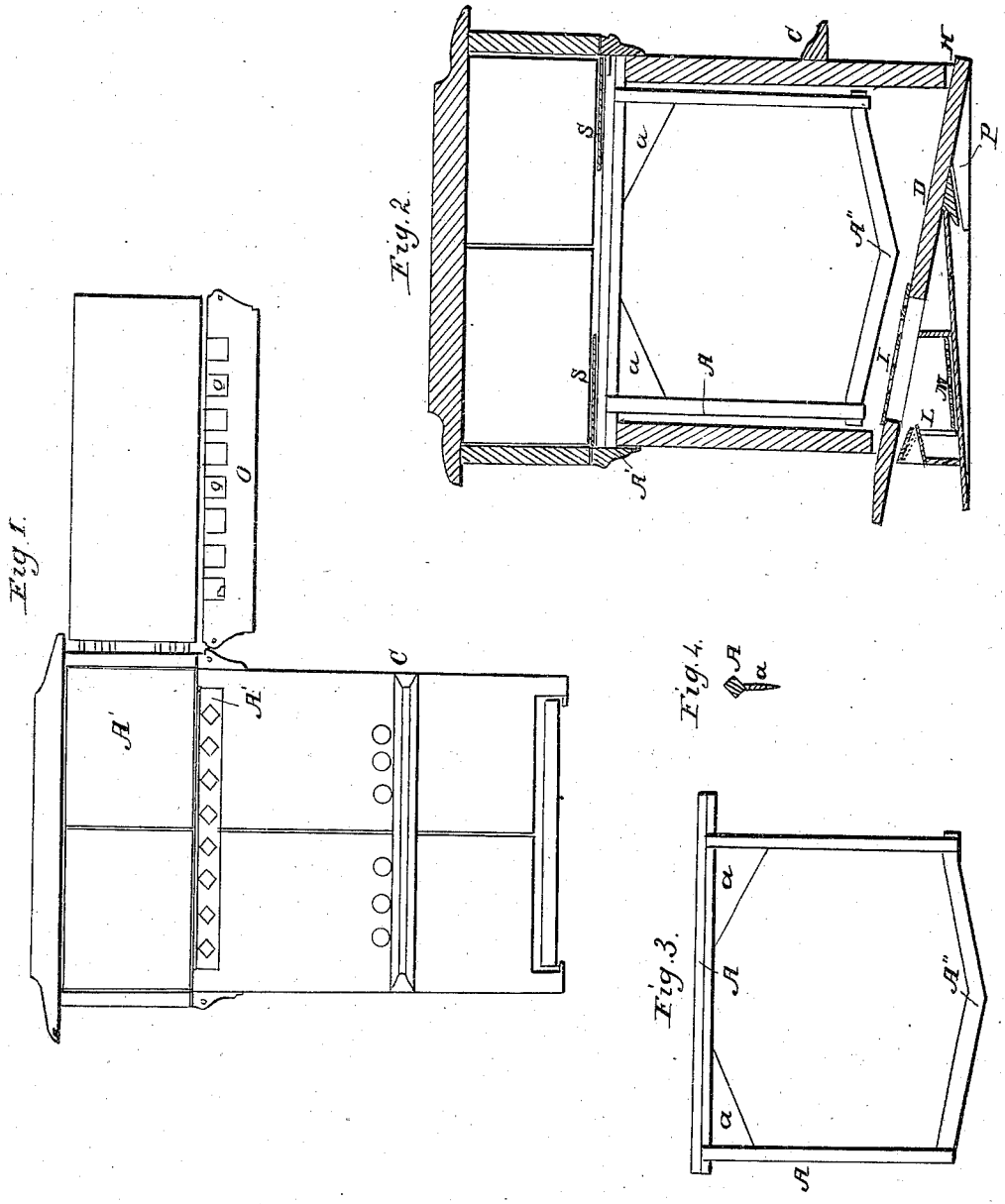

UNITED STATES PATENT OFFICE.

WALTER M. LEE, OF ROSINDALE, WISCONSIN.

IMPROVEMENT IN BEE-HIVES.

Specification forming part of Letters Patent No. 39,660, dated August 25, 1863.

*To all whom it may concern:*

Be it known that I, WALTER M. LEE, of Rosindale, in the county of Fond Du Lac and State of Wisconsin, have invented a new and useful Improvement in Bee-Hives; and I do hereby declare that the following is a full and exact description thereof, reference being had to the accompanying drawings, and to the letters of reference marked thereon.

My invention consists in a peculiar construction and arrangement of bee-hives, and relates especially to the comb-frames, bee-passages, bottom board, and feeder.

In the accompanying drawings, Figure 1 is a front view of a hive with my improvements, the door being open and the frame-holder removed in order to show the ends of the comb-bars and the honey-boxes.

My comb-frames, Figs. 3 and 4, are of peculiar construction. The upper bar is a square strip set diagonally, as seen at A', Fig. 3. The lower sharp edge of this strip, being in the center of the bar, will compel the bees to commence the construction of the sheet of comb in the central plane of the frame. At each upper corner of the frame I put a thin comb guide or brace, a, Figs. 3 and 4, with its lower edge also sharp, so as to compel the bees to commence building down the sides of the frame in the same central plane. The sheet of comb thus commenced is certain to be continued without warping.

The lower bar of my frame is made lower in the center, in order that the comb in being built downward may reach and rest upon the ends of this lower bar and yet allow the bottom of the comb to droop at the center as the bees usually and naturally build the comb.

Numerous experiments satisfy me of the superior excellence of my comb-frame. They secure plane sheets of comb, easily removed, while they are so braced as not to spring at the joints in bearing the weight of comb and honey on removal from the hive. Common frames, on the contrary, are apt to give warped sheets of comb, not capable of removal without disturbing the adjoining sheets, and the frames often spring or give at the corners, and thus break down the comb by its own weight on removal.

Another peculiar advantage of my frames is the arrangement of the ends of the upper bar. These ends project beyond the sides of the hive and rest in notches o in the frame-holder O, Fig. 1. This upper bar rests upon its lower sharp edge and is not liable to be held fast by wax, as is common with other comb-frames. The frame-holders O consist of strips fastened upon the outer sides of the wall of the hive and provided with notches o for embracing the ends of the bar and thus holding the frames in place. The bars may also rest on the top of the main wall of the hive or on wires or other support, so that the frame-holders may be removed, leaving the frames in place. On removing the frame-holders the ends of the upper bar, projecting beyond the walls of the hive, may readily be grasped in order to lift the frame without placing the hands near the bees. Some distance above the bottom of the hive is a series of doors, B, and a door-stool, C, for the accommodation of the bees, especially when it is desirable to close the bottom of the hive. This door-stool may be inserted into a dovetailed groove in the wall of the hive in order to fasten and strengthen the parts. Between the comb-frames and the sides of the hive there are passages for the bees to ascend above the frames and pass along on the upper bars, A, to enter the honey-boxes. Two boards, S, are placed under the honey-boxes for the latter to rest upon, covering about two-thirds of the area of the top of the comb-frames. These boards direct the ascending current of warm air into the opening of the honey-boxes and afford abundant space for the bees in the upper and warmer part of the hive. The bottom board, D, rests upon an inclined plane, P, in such manner that by pushing the board D forward the entrance H is closed. The rear end of this bottom board rests on buttons by which the opening of the back door can be graduated at pleasure, so as to shut out the drones and shut in the queen-bee, or close the hive.

My bee-feeder and moth-trap are combined. The screen I is made movable so as to open when the bees are to be fed, and closed when the moth-trap is used. The feed-trough L has a perforated board, M, near the bottom for the bees to rest upon while feeding. At the rear of the bee-feeder and trap is a door, R, so arranged as to be easily opened by the moths and yet to close against escape from the trap.

Having thus fully set forth my invention, what I claim, and desire to secure by Letters Patent of the United States, is—

1. The combination of the comb guides or braces *a* with the sharp edge of the under side of the comb-bar A', substantially in the manner and for the purposes set forth.

2. The arrangement, in combination with the hive, of the bottom board, D, riding on wedges P and supported by buttons behind, substantially in the manner and for the purposes specified.

W. M. LEE.

Witnesses:
W. L. VINCENT,
B. F. EDDY.